May 29, 1951 M. J. CHANDLER 2,554,730
TENONING AND GROOVING ATTACHMENT FOR SHAPERS
Filed Nov. 17, 1947

INVENTOR.
MARVIN J. CHANDLER
BY Lynn Latta
ATTORNEY

UNITED STATES PATENT OFFICE 2,554,730

TENONING AND GROOVING ATTACHMENT FOR SHAPERS

Marvin J. Chandler, El Monte, Calif., assignor to Woolston-Chandler Company, a corporation of California Application November 17, 1947, Serial No. 786,399

9 Claims. (Cl. 144—253)

This invention relates to woodworking machines. Its general object is to provide an accessory apparatus, attachable to a shaper, for converting a shaper into a machine for tenoning, coping, grooving or channelling.

A shaper has a flat horizontal bed and a vertical arbor rising therefrom. A gate is customarily associated with the cutter head at the upper end of the arbor, to guide the work that is fed past the cutter head while slidably supported on the bed. Where only the end of a narrow piece of work is to be operated on, however, as in tenoning or coping, it is not practicable to use a gate, and it is not feasible to attempt to guide a piece past the cutter without utilizing a guide, since the cutter tends to drag the work closer. It is therefore customary to employ a special machine for tenoning and allied operations. But such machines are expensive, and many woodworking shops cannot afford the investment required to obtain such a machine.

The primary object of my invention, therefore, is to provide a relatively simple and inexpensive attachment for a shaper, by means of which tenoning and allied operations may be performed on a shaper, thus obviating the necessity for a tenoning machine. To the end of attaining simplicity, the invention utilizes the shaper bed for supporting the work, and accordingly, one of its objects is to provide a means for gripping an elongated workpiece, securely holding it against longitudinal movement and permitting it to freely slide laterally while resting upon the bed of the shaper, with one end of the piece in position to be operated upon by the cutter as it moves past the same.

Another object is to provide for rapid change of workpieces. Accordingly, the invention provides means for applying manual clamping pressure to the gripping means. A further object is to provide a manual pressure applying means which will not in any way detract from the application of translational movement to the work. This is accomplished by utilizing a post, fixed to the carriage of the attachment, both as a handle for transmitting movement to the carriage and as one of two handles to be grasped in the operator's hand and squeezed toward each other to apply clamping pressure to the work.

Another object is to provide for varying the angle of cut across the end of a workpiece.

A further object is to provide for readily shifting the tenoning attachment to a position in which it leaves the shaper bed entirely unobstructed for formal shaper operations, and for as readily shifting it back to an operative position.

A further object is to provide an attachment for a shaper that is adapted to accomplish all of the foregoing objects, and is of relatively simple, inexpensive but extremely durable and sturdy construction.

Other objects will become apparent in the ensuing specifications and appended drawings in which.

Figure 2:
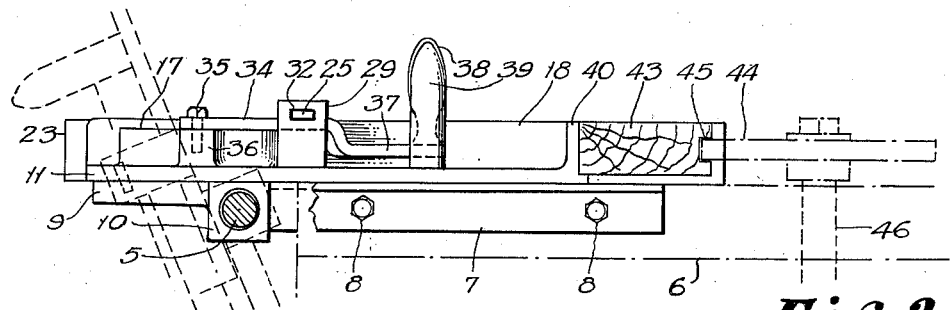
Fig. 2 is a front view of the same.

As an example of one form in which my invention may be embodied, I have shown in the drawing an apparatus embodying a cylindrical rail 5 which may be attached to a shaper bed 6 by means of a pair of arms 7 to which its respective ends are secured. The arms 7 are attached to the forward and rear edges of the bed, below the plane of the upper surface of the bed, by screws 8. The rail is positioned parallel to and spaced from the side edge of the bed, below the plane of the upper surface thereof.

A bracket 9 has a bearing portion 10 through which the rail 5 extends. On the bracket 9 is supported a carriage 11. A stud 12 extends through an opening in the carriage 11 and is secured in the bracket 9, thus pivoting the carriage to the bracket for horizontal swinging movement. A clamp screw 13 extends through an arcuate slot 14 in the carriage 11, is threaded into the bracket 9, and has a head 15 which, when tightened, exerts, through a washer 16, clamping engagement with land surfaces 17 adjacent the slot 14.

On the forward side of the carriage 11 is an upwardly projecting flange 18 which has a forward surface 19 that is flat and disposed at right angles to the under surface 20 of the carriage 11. The under surface 20 bears against the upper surface 21 of the bracket 9, and the surface 21 is disposed at such a distance from the center of the rail 5 as to be capable of assuming a position lying in the same plane as the upper surface 22 of the shaper bed 6. Thus it becomes possible for the under surface 20 of the carriage 11 to lie flatly against the upper surface 22 of the bed 6 and to slide smoothly thereover in the normal operation of the attachment.

Figure 1:
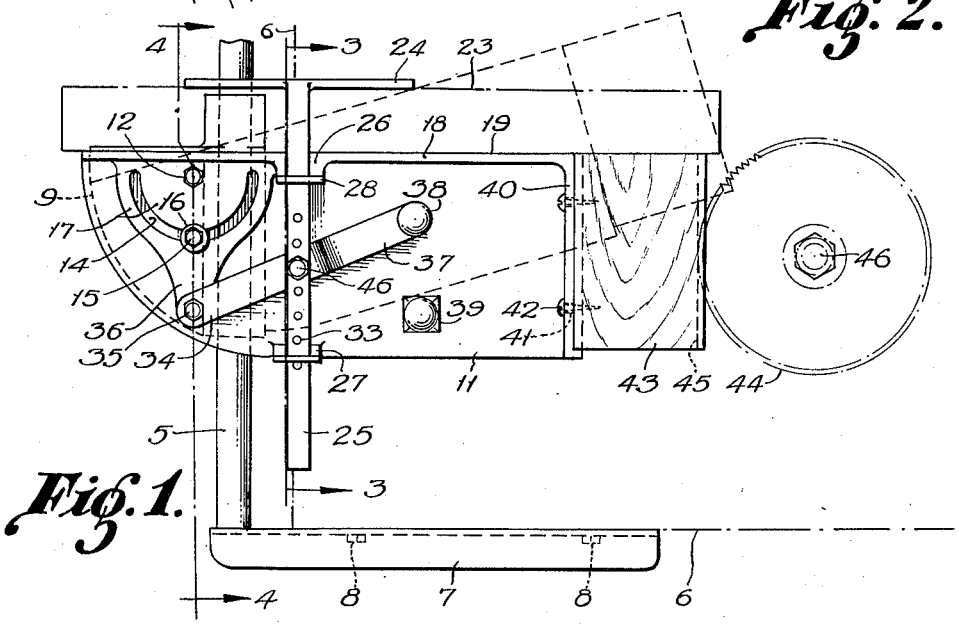
Fig. 1 is a plan view of a shaper, having an apparatus embodying my invention, attached thereto.
Figure 3:
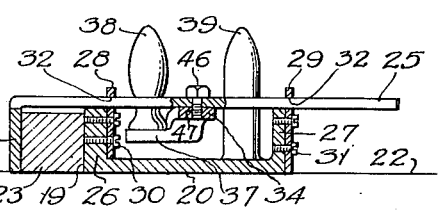
Fig. 3 is a sectional view thereof taken on the line 3—3 of Fig. 1.
Figure 4:
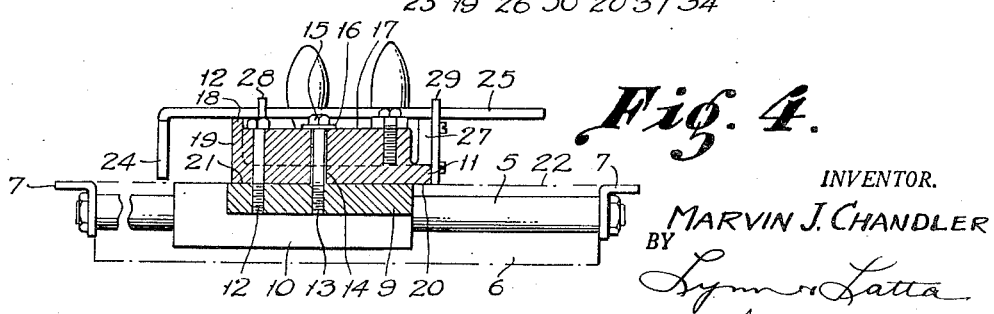
Fig. 4 is a sectional view thereof taken on the line 4—4 of Fig. 1.

A workpiece, in the form of a relatively narrow, elongated stick of wood, indicated at 23 in Fig. 1, may be positioned against the forward face 19 of the flange 18 while resting upon the upper surface 22 of the bed 6. The invention provides means for securely clamping the workpiece 23 in this position, such means comprising a clamping jaw 24 carried by one end of an arm 25 that is slidably supported upon bosses 26 and 27 projecting upwardly from the bed 11. The boss 26 may, as shown, comprise simply a thickened portion of the flange 18 on the rear side thereof. The arm 25 is guided for longitudinally sliding movement on the upper surfaces of the bosses 26, 27, by means of a pair of guide plates 28, 29 which are secured, as by means of screws 30, 31 to the rear sides of the bosses 26, 27 respectively. Each of the plates 28, 29 has a slot 32 conforming to the cross sectional shape of the arm 25, with just sufficient clearance to permit the arm 25 to slide freely therein. The arm 25 is of non-circluar cross section, preferably rectangular, whereby its confinement in the guides 28, 29 positions the jaw 24 at all times in a position extending parallel to the upper surface of the bed 6. This makes it possible to have only a slight clearance between the lower edge of the jaw 24 and the upper surface 22, in order that the jaw 24 may engage substantially the entire width of the workpiece 23, thereby minimizing marking of the workpiece by the pressure applied through the jaw, and at the same time obtaining maximum gripping engagement with the workpiece for a jaw of given length. A preferred method of constructing the jaw 24 and arm 25 is to employ fairly heavy sheet or strip material for both parts, and to either stamp both parts as an integral stamping from a single sheet of such material, later bending the jaw 24 to a position at right angles to the arm 25, or to use separate strips of such material, welding one end of the arm 25 to the upper edge of the jaw 24. Either method provides for relatively inexpensive construction.

The arm 25 is provided with a series of spaced apertures 33 in its middle region. An operating lever 34 is pivoted, by means of a screw 35, upon the upper surface of a boss 36 which may consist in a rearward extension of the rear land 17 of the carriage 11. The opposite end portion 37 of the lever 34 is offset downwardly from the body of the lever 34 and is provided with an upwardly extending handle 38. A post 39 is fixed to the carriage 11 and projects upwardly therefrom at a position aligned with the path of circumferential swing of the handle 38 about the pivot 35.

The end of the carriage 11 opposite the end which is attached to the bracket 9, is provided with an upwardly projecting flange 40 having openings 41 therein through which screws 42 may be extended into a block of wood 43, in order to secure said block 43 against the outer face of the flange. One end of the block 43 may be shaped to form an extension of the forward face 19 of the flange 18, and the outer side of the block 43 may overlap the shaper cutter 44, and be grooved thereby as indicated at 45. Thus the block 43 may serve as a protection for the right hand of an operator, covering the cutting edge of the cutter 44 as the workpiece 23 passes the same.

The cutter 44 is carried by the shaper tool arbor 46 which projects upwardly from the bed 6 of the shaper.

In the operation of the apparatus, the spacing between the jaw 24 and flange 18 is adjusted to the width of the workpiece 23. This may be done by removing the screw 46, sliding one of the workpieces 23 between the jaw 24 and flange 18, and closing the jaw 24 upon the workpiece 18, with the workpiece in engagement with flange 18. The lever 34 is then moved to a position in which its threaded opening 47 registers with one of the openings 33 and with a substantial spacing between the handle 38 and post 39 (preferably in the neighborhood of an inch or more), so that when the jaw 24 is tightly clamped against the workpiece the handle 38 and post 39 may be engaged between the fingers and thumb of the operator's right hand, with the hand in a position to exert its maximum grip in drawing the handle 38 toward the post 39. The screw 46 is then inserted into the registering openings and threaded into the lever 34. It will be obvious from the foregoing that the particular aperture 33 that is employed will depend upon the width of the workpiece, and the invention provides for adjustment of the clamping mechanism to workpieces of varying widths.

With the apparatus thus adjusted for the particular workpieces that are to be operated on, the operator will grasp the handle 38, preferably in the right hand, and move it into engagement with the flange 18 in order to fully open the jaw 24. A workpiece 23 may then be quickly slipped between the jaws 24 and flange 18 and the handle 38 moved back toward the post 39, the thumb extended around the post 39 and gripping pressure exerted to draw the handle 38 toward the post 39, thus clamping the workpiece 23 securely against the flange 18. Continuing to apply the grip between the handle 38 and post 39, the operator will then push the entire carriage forwardly, sliding it and the workpiece upon the upper surface 22 of the shaper bed, with the bearing 10 sliding on the rail 5 and maintaining the workpiece 23 in a fixed angular relation to the rail 5 and thus to the edge of the shaper bed 6 and to the direction of movement of the workpiece. In most operations (for example, in tenoning) the workpiece will be positioned at right angles to the direction of movement. This position is shown in full lines in Fig. 1. When the workpiece is positioned at right angles to its direction of movement, the cut in its end will of course be at right angles to its sides. However, there may be cases where it may be desirable to make a cut at an acute angle to the sides of the workpiece. For example, there are some types of frame structure in which a triangular shaped tenon or flange is produced by a mitered cut, usually at a 45 degree angle, leaving a mitered shoulder for engagement with a correspondingly mitered shoulder on another frame piece. Such a cut may be accomplished by setting the carriage 11 at an acute angle to the axis of the bearing 10. The slot 14, being of 180 degree circumferential extent, permits the adjustment of the carriage 11 sufficiently to bring the flange 18 to an angle of 45 degrees or 135 degrees with relation to the axis of the bearing 10. Such adjustment is accomplished simply by loosening the screw 15, swinging the carriage ot the desired position and tightening the screw to secure the carriage in that position.

When it is desired to use the shaper for normal shaping operations, the carriage 11 may be swung upwardly, the bearing 10 rotating about the cylindrical rail 5, until the outer extremity of the bracket 9, extending downwardly and inwardly, contacts the under side of the shaper bed 6. In Fig. 2, the dotted lines indicate the carriage being swung to approach this position. From this position the carriage may be quickly slipped back to the operative position shown in full lines.

I claim:

1. For a shaper including a bed having a horizontal upper bearing surface and a vertical arbor for supporting a rotary cutting tool above said surface, work guiding mechanism comprising: a rail, means for attaching said rail to said bed in a position parallel to and spaced from one side of said bed; a bracket having a bearing receiving said rail and slidable thereon; a carriage attached to said bracket and having an under surface adapted to bear against said upper bearing surface of the bed and to slide thereon parallel to the axis of said rail, said carriage having at its forward side a flange providing a generally vertical wall functioning as a work engaging jaw, an arm extending over said carriage at right angles to said wall, a movable jaw carried by the forward end of said arm and extending downwardly parallel to said wall, said movable jaw being cooperable with said wall to provide an open bottom, open ended vise for clamping a work piece in direct sliding engagement with said bearing surface; and means mounting said arm in said carriage for longitudinal sliding movement to spread and close said jaws.

2. Mechanism as defined in claim 1, in which said rail is cylindrical and said bearing provides for hinging movement of said carriage from an operative position resting upon said upper bearing surface of the bed to an inoperative position disposed beyond the side of the bed.

3. In a shaper including a bed having a horizontal upper bearing surface and a vertical arbor for supporting a rotary cutting tool above said surface, work guiding mechanism comprising: a rail, means for ataching said rail to said bed in a position parallel to and spaced from one side of said bed; a bracket having a bearing receiving said rail and slidable thereon; a carriage attached to said bracket and having an under surface adapted to bear against said upper bearing surface of the bed and to slide thereon parallel to the axis of said rail, said carriage having at its forward side a flange providing a generally vertical wall functioning as a work engaging jaw, an arm extending over said carriage at right angles to said wall, a movable jaw carried by the forward end of said arm and extending downwardly parallel to said wall, said movable jaw being cooperable with said wall to provide an open bottom, open ended vise for clamping a work piece in direct sliding engagement with said bearing surface; means mounting said arm in said carriage for longitudinal sliding movement to spread and close said jaws; a lever having one end pivoted to said carriage, extending horizontally in crossed relation to said arm and pivoted thereto; a handle extending from the free end of said lever; and a handle secured to said carriage and extending therefrom in spaced relation to said lever handle along a line generally parallel to said arm, whereby said handles may be simultaneously gripped by the operator for closing said jaws on a work piece and exerting clamping pressure thereon, and also for moving said bracket and carriage bodily parallel to said rail and thereby moving a projecting end of said work piece into engagement with said cutter.

4. In a shaper having a bed provided with a horizontal upper work supporting surface and having a vertical arbor rising therefrom, work guiding mechanism comprising: a guide rail, means for attaching said rail to said bed in a position parallel to and spaced from one side of the bed; a bracket having a bearing receiving said rail and slidable thereon; a carriage carried by said bracket and having an under surface adapted to slide upon said upper work supporting surface; said carriage having along its forward side a generally vertical wall functioning as a work engaging jaw; an arm mounted in said carriage for longitudinal sliding movement on an axis generally at right angles to said wall; a movable jaw carried by the forward end of said arm and disposed generally parallel to said wall; said movable jaw being cooperable with said wall to provide an open ended vise for clamping a work piece with one end projecting for engagement with said cutter; a lever having one end pivoted to said carriage, extending generally horizontally in crossed relation to said arm and pivoted thereto; a handle on the other end of said lever; and a handle secured to said carriage and extending therefrom in spaced relation to said lever handle along a line generally parallel to said arm, whereby an operator may simultaneously grasp both of said handles and, by squeezing pressure, may close said vise in clamping engagement upon a work piece and simultaneously utilize said handles as a means for transmitting to said carriage, fore and aft sliding movement past said cutter.

5. Mechanism as defined in claim 4, including means pivotally mounting said carriage upon said bracket for adjustment about an axis at right angles to the plane of said carriage, whereby to vary the angle of the work piece relative to its direction of movement past the cutter.

6. Mechanism as defined in claim 4, wherein said rail is cylindrical and said bearing provides for hinging movement of said carriage from an operative position resting upon the upper surface of said bed to an inoperative position disposed beyond the side of said bed.

7. Mechanism as defined in claim 4, wherein said arm is of rectangular cross section and wherein said carriage includes bearing means in which said arm is guided for longitudinal sliding movement and restrained against rotational movement about its own axis.

8. For a shaper having a bed provided with a horizontal upper work supporting surface and having a vertical arbor rising therefrom for supporting a rotary cutting tool, a work guiding mechanism comprising: a carriage adapted to rest in a generally horizontal position upon said work supporting surface, for sliding movement thereon; cooperating means on said bed and carriage respectively for guiding said carriage in sliding movement upon said work supporting surface, past said cutting tool; said carriage having along its forward side a wall which is generally vertical when said carriage is in said horizontal position, said wall providing a work engaging jaw; an arm mounted in said carriage for longitudinal sliding movement along an axis generally at right angles to said wall; a cooperating jaw carried by the forward end of said arm in generally parallel spaced relationship to said wall and cooperable therewith to provide a work clamping vise; a lever pivoted at one end to said carriage, extending generally parallel to the plane of the carriage in crossed relation to said arm and pivoted thereto; a handle on the other end of said lever; a second handle secured to said carriage and projecting in generally parallel relationship to the first mentioned handle and spaced therefrom on a line generally parallel to said arm, with said lever handle disposed between said second handle and said forward flange; whereby an operator may simultaneously grasp both of said handles, and, by squeezing pressure, may close said vise in clamping engagement upon a work piece and simultaneously utilize said handles as a means for transmitting to said carriage fore and aft sliding movement past said cutter.

9. For a shaper having a bed provided with a horizontal work supporting upper surface and having a vertical arbor arising therefrom, for supporting a rotary cutting tool; work guiding mechanism comprising: a carriage adapted to rest flatly upon said work supporting surface for sliding movement thereon; cooperating means on said bed and carriage for guiding said carriage in bodily sliding movement past said cutting tool; said carriage having a forward upwardly extending flange providing a forward wall disposed in a plane generally transverse to the direction of said sliding movement and functioning as a work engaging jaw; said carriage having an end flange for supporting a wood block for mating association with said cutter and for extending said forward wall; an arm extending over said carriage and bearing against an upper face of said forward flange; a lug projecting upwardly from the rear side of said carriage and having an upper end, level with said upper flange face, against which said arm also bears; bearing means secured to the rear side of said flange and to said lug and extending upwardly, said bearing means having guide slots in which said arm is retained for longitudinal sliding movement in a direction generally parallel to the direction of said sliding movement of the carriage; a jaw carried by the forward end of said arm, projecting downwardly in spaced parallel relationship to said forward jaw, and cooperating therewith to provide a vise for clamping a work piece in a position generally transverse to the direction of sliding movement of said carriage; a lever having one end pivoted to said carriage and an intermediate portion pivoted to said arm, said lever extending generally parallel to the plane of said carriage in crossed relation to said arm and having its other end projecting beyond said arm and provided with a handle; a second handle secured to said carriage and extending in generally parallel, spaced relation to said lever handle along a line generally parallel to the axis of movement of said arm, with said lever handle disposed between said second handle and said forward flange, whereby an operator may grasp said handles and by applying squeezing pressure thereto, may effect closing of said vise in clamping engagement with a work piece and at the same time utilize said handle to transmit sliding movement to said carriage for moving the work piece past said cutter.

MARVIN J. CHANDLER.

REFERENCES CITED

The following references are of record in the file of this patent:

UNITED STATES PATENTS

| Number | Name | Date |
|---|---|---|
| 15,572 | Potter | Aug. 19, 1856 |
| 707,641 | Rostochil | Aug. 26, 1902 |
| 1,098,465 | Weigand | June 2, 1914 |
| 1,551,052 | Pollock | Aug. 25, 1925 |
| 2,001,306 | Gressner | May 14, 1935 |
| 2,085,235 | Tautz | June 29, 1937 |
| 2,085,236 | Tautz | June 29, 1937 |
| 2,310,813 | Sellmeyer | Feb. 9, 1943 |
| 2,374,899 | Sasgen | May 1, 1945 |
| 2,463,438 | Steiner | Mar. 1, 1949 |